US012775621B2

(12) United States Patent
Ono et al.

(10) Patent No.: US 12,775,621 B2
(45) Date of Patent: Oct. 27, 2026

(54) DYNAMIC CACHING OF RESOURCES BY RESOURCE TYPE

(71) Applicant: Oracle International Corporation, Redwood Shores, CA (US)

(72) Inventors: Catherine Ono, Santa Clara, CA (US); Andrew Ingham, Romsey (GB); Norman Lee, Santa Clara, CA (US); Wai Shun Wilson Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/626,248

(22) Filed: Apr. 3, 2024

(65) Prior Publication Data

US 2025/0315434 A1 Oct. 9, 2025

(51) Int. Cl.
*G06F 15/16* (2006.01)
*G06F 16/2455* (2019.01)

(52) U.S. Cl.
CPC .............................. *G06F 16/24552* (2019.01)

(58) Field of Classification Search
None
See application file for complete search history.

(56) References Cited

U.S. PATENT DOCUMENTS 7,454,571 B1 * 11/2008 Sucharitakul ..... G06F 16/24552 711/170
2004/0039886 A1 * 2/2004 Christofferson .... G06F 12/0888 711/139
2013/0054915 A1 * 2/2013 Chee ....................... G06F 9/526 711/E12.091
2013/0144853 A1 * 6/2013 Kohno ................ G06F 16/2343 707/704
2016/0179681 A1 * 6/2016 Greenspan ................ G06F 9/52 711/128
2017/0060635 A1 * 3/2017 Wu ....................... G06F 9/5011
2020/0401529 A1 * 12/2020 Zhang ................... G06F 9/3877
2021/0334009 A1 * 10/2021 Jung ................... G06F 12/0246
2022/0006855 A1 * 1/2022 Hassan ................. G06F 16/951
2023/0333958 A1 * 10/2023 Zhang ................. G06F 11/3409
2024/0289915 A1 * 8/2024 Durbhakula ........ G06F 12/0897

OTHER PUBLICATIONS

Romero, F., et al., "Faa$T: A Transparent Auto-Scaling Cache for Serverless Applications," SoCC '21, Nov. 1-4, 2021, Seattle, WA, USA.
Chengxiang, S., "The Research on Cache Management of Cloud Storage," International Journal of Chaotic Computing (IJCC), vol. 1, Issue 2, Dec. 2012.
Abdi, M., et al., "A Community Cache with Complete Information," Proceedings of the 19th USENIX Conference on File and Storage Technologies. Feb. 23-25, 2021.
(Continued)

*Primary Examiner* — Alex Gofman
(74) *Attorney, Agent, or Firm* — Vista IP Law Group, LLP

(57) ABSTRACT

Described are improved systems, computer program products, and methods for providing an improved approach to implement dynamic cache management, where statistics are maintained for the use and reuse of resources by resource type. The statistics are used to determine which resource types to cache and which types should not be cached.

21 Claims, 9 Drawing Sheets

(56) References Cited

OTHER PUBLICATIONS

Rowstron, A., et al., "Storage management and caching in PAST, a large-scale, persistent peer-to-peer storage utility," SOSP-18 Nov. 2001 Canada, dated Nov. 2001, ACM 0-12345-67-8/90/01.
Wu, K., et al., "NyxCache: Flexible and Efficient Multi-tenant Persistent Memory Caching," Proceedings of the 20th USENIX Conference on File and Storage Technologies. Feb. 22-24, 2022, Santa Clara, CA, USA.
Song, W., et al., "CacheInspector : Reverse Engineering Cache Resources in Public Clouds," ACM Transactions on Architecture and Code Optimization, vol. 18, No. 3, Article 35. Publication date: Jun. 2021.
Monção, A., et al., "Combining Resource-Aware Recommendation and Caching in the Era of MEC for Improving the Experience of Video Streaming Users," IEEE Transactions on Services Computing, dated 2022, pp. 1-14.
Ferragut, A., et al., "Optimizing TTL Caches under Heavy-Tailed Demands," IGMetrics '16, Jun. 14-18, 2016, Antibes Juan-Les-Pins, France © 2016 ACM. ISBN 978-1-4503-4266-7/16/06.
Gracioli, G., et al., "A Survey on Cache Management Mechanisms for Real-Time Embedded Systems," ACM Comput. Surv. 48, 2, Article 32 (Nov. 2015), 36 pages. DOI: http://dx.doi.org/10.1145/2830555.
Chandra, R., et al., "The Collective: A Cache-Based System Management Architecture," Computer Science Department, Stanford University, Presented at the 2nd Symposium on Networked Systems Design and Implementation, May 2-4, 2005.
Zhang, L., et al., "Optimal Data Placement for Heterogeneous Cache, Memory, and Storage Systems," Proc. ACM Meas. Anal. Comput. Syst. 4, 1, Article 6 (Mar. 2020), 27 pages.
Einziger, G., et al., "Lightweight Robust Size Aware Cache Management," ACM Trans. Storage 18, 3, Article 27 (Aug. 2022), 23 pages.
Beckmann, N., et al., "Talus: A Simple Way to Remove Cliffs in Cache Performance," Appears in the Proceedings of the 21st International Symposium on High Performance Computer Architecture (HPCA), 2015.
Mertz, J., et al., "Understanding Application-level Caching in Web Applications: a Comprehensive Introduction and Survey of State-of-the-art Approaches," ACM Comput. Surv. 9, 4, Article 39, (Mar. 2017), 32 pages.

* cited by examiner

DYNAMIC CACHING OF RESOURCES BY RESOURCE TYPE

BACKGROUND

Caching is a technique widely adopted by modern computing systems for efficiently providing access to data and/or other resources within the system. The core design philosophy of a caching system is to hold the frequently accessed resources in a faster storage tier, in order to leverage its superior performance benefit, while leaving the less frequently accessed data on slower storage tiers, which typically has larger capacity.

Caching is especially useful in data processing systems, such as database management systems (DBMSs) and relational database management systems (RDBMSs). Such systems allow applications running on clients (e.g., workstations, personal computers, or remote computing terminals) to access data stored in databases located at one or more database servers. Database servers may be interconnected by a network, where the network may also connect one or more clients to the database servers, allowing the clients to submit queries and requests to perform operations on the data stored at the database servers via the network.

In some database systems, a resource to be cached may correspond to a resource for which access by a database process is serialized or otherwise controlled using a lock manager. When a resource is available in a local cache, that resource can be accessed by a database process without undergoing the expense of additional lock processing to a remote lock master. However, if a cache miss occurs for that resource, then expensive lock processing to a remote lock master across a network connection may need to be performed in order to obtain enough rights to operate upon the resource. Therefore, in such database systems, it is particularly important to be able to correctly perform cache management to optimize the composition of the local cache to minimize cache misses.

The problem is that conventional database systems often do not optimally provide a correct level of cache management for its resources that take into account the correct usage patterns for the resources within the system. This may result in inefficiencies, such as large caches of resources that are unlikely to be reused, while also causing a failure to properly place resources into cache that are more likely to be reused. This situation may cause significant performance problems for the database system.

Therefore, there is a need for an improved approach to perform cache management within a database system.

SUMMARY

Some embodiments of the invention provide an improved approach to implement dynamic cache management, where statistics are maintained for the use and reuse of resources by resource type, and those statistics are used to determine which resource types to cache and which types not to cache.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120*a*," indicates that the text refers specifically to the element having that particular reference numeral. A reference numeral in the text without a following letter, such as "120," refers to any or all of the elements in the drawings bearing that reference numeral (e.g., "120" in the text refers to reference numerals "120*a*" and/or "120*b*" in the drawings). The disclosure will be described and explained with additional specificity and detail through the use of the accompanying drawings in which.

DETAILED DESCRIPTION

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles “a” and “an” as used in this application and the appended claims should generally be construed to mean “one or more” unless specified otherwise or is clear from the context to be directed to a singular form.

Some embodiments of the invention provide an improved approach to implement dynamic cache management, where statistics are maintained for the use and reuse of resources by resource type. Those statistics are used to determine which resource types to cache and which resource types should not be cached.

Figure 1:
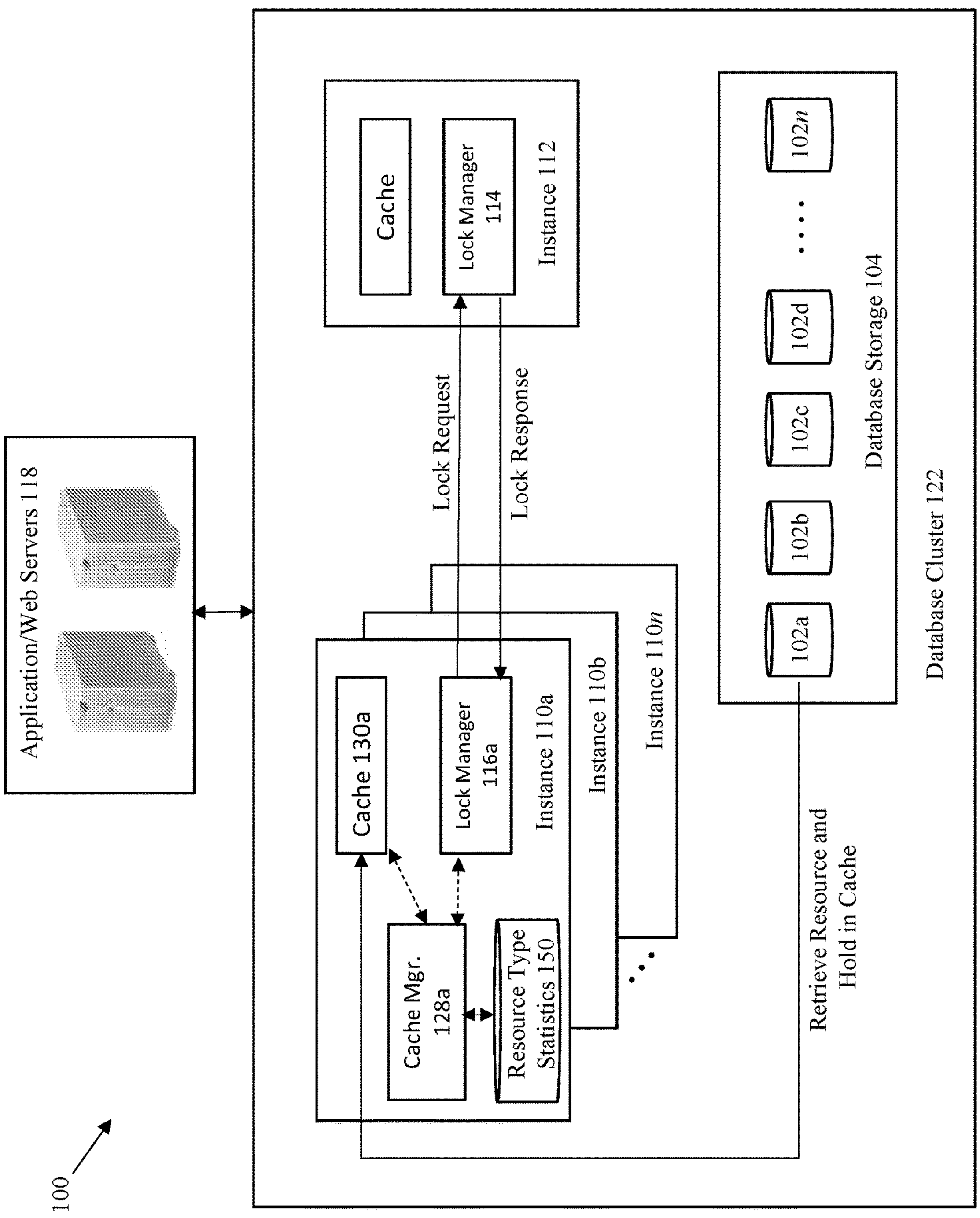
FIG. 1 shows an example database environment in which some embodiments of the invention may be implemented.

FIG. 1 shows an example database environment 100 in which some embodiments of the invention may be implemented. Here, the example database environment 100 corresponds to a database “cluster”. A database cluster is a type of system that allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files.

It is noted that while the illustrated example shown here corresponds to a clustered environment, the invention is not limited in its application only to clustered environments, and indeed may be applied to any suitable type of system that includes a cache.

The clustered database environment 102 includes a shared database and allows a single database to be run across multiple instances/nodes (e.g., servers) in order to improve or maximize availability and to enable horizontal scalability, while accessing shared storage (e.g., the shared storage 104). For example, the clustered database environment may include a plurality of instances 110*a*, 110*b*, . . . 110*n*, where each instance of the plurality of instances may correspond to one or more entities that perform database-related operations in the system. An entity may include a session as well as any other suitable processing entities such as a process, thread, container, virtual machine, application, service, or any other useful type of processing entity. Each of the database instances may reside on a separate host and forms its own set of background processes and memory buffers, but in which the cluster infrastructure allows access to a single shared database via multiple database instances. In this way, the separate instances appear as if they are one system to applications/web servers (118) and end users.

The database system may include one or more users or database applications within the system that operate from or using a user station to issue commands to be processed by database management system (DBMS) upon one or more database tables. The user stations and/or the servers that host or operate with the database system comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to a storage device (e.g., a storage subsystem or appliance) over a network. The storage device comprises any storage mechanism that may be employed by the database system to hold storage content, such as but not limited to a hard disk drive, SSD, persistent memory, storage array, network attached storage, etc.

The database storage 104 may include any number of data storage devices and/or objects 102*a-n* that are stored within the system, and which consume storage space on the database storage 104. In a shared-everything database cluster, all nodes/instances in the cluster may modify the data segments stored on the shared storage system.

In general, database applications and/or end users interact with a database system by submitting commands that cause the database to perform operations on data stored in a database. For the database server to process the commands, the commands typically conform to a database language supported by the database server. An example of a commonly used database language supported by many database servers is known as the Structured Query Language (SQL). A database “transaction” corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

Since the multiple instances in the system are permitted to access the same set of shared underlying content within the database, a synchronization mechanism is usually provided to prevent conflicts when the multiple instances seek to access the same shared resources at the same time. Lock management is a common approach that is used to synchronize accesses to the shared resources. A resource corresponds to any object or entity to which shared access must be controlled. For example, the resource can be a file, a record, an area of shared memory, a database row/column, or anything else that can be shared by multiple entities in a system. An entity can acquire locks on the database as a whole, or only on particular parts of the database. When any of the instances seek to access data within the database, a lock may need to be acquired using the lock management system to avoid inconsistent access to that data. There are many types of locks that may potentially be taken on the data. For example, the exclusive (EX or X) lock is a lock that can be held by only a single entity, which allows read and update access to the resource while preventing others from having any access to that locked resource. A shared (S) lock can be held by multiple entities at the same time, which allows an entity holding the lock to read the resource while preventing other entities from updating that resource.

There are several possible approaches that can be taken to implement a lock management system. One common approach is to use a centralized lock management (CLM) service in which the locks are managed in a centralized location. The enqueues of the lock requests are centrally managed in a dedicated database (DB) component. When an instance seeks access to a given resource, the instance sends a request to the centralized lock management component to obtain a lock on the resource.

Another possibility is to use a Distributed Lock Management (DLM) approach, which permits multiple database instances to access the same database files simultaneously, where communications between the instances are managed by the Distributed Lock Manager (DLM). To address the possibility of two or more instances attempting to modify the same information simultaneously, the DLM uses multiple distributed processes to lock the resources in use by these instances, e.g., where a first instance has a DLM that manages locks for a first database object and a second instance has a DLM that manages locks for a second database object.

As previously noted, a resource corresponds to any entity for which access by database processes is serialized or otherwise controlled by the lock manager. Each resource may have a master instance among active instances in the cluster. When a process needs to access a resource, it requests a lock from the master instance and waits for it to be granted. If the master is remote, this requires sending a message, and waiting for a reply. A lock is allocated locally, either from a free list if available or from shared memory if not. Once the resource is no longer needed, it may then be freed and that memory made available for future allocations.

For example, in FIG. 1, assume that instance 112 is the master for a given resource that is sought to be accessed by instance 110*a*. Here, a lock request message may need to be sent from lock manager 116*a* on instance 110*a* to the lock manager 114 on instance 112. The lock manager 114 will then send back a reply message that either permits or denies the lock request. If permitted, the locally allocated lock is then "converted" into the desired lock mode to allow access to the resource. For this reason, a lock request sent to a DLM may also be referred to herein as a "convert message".

The resources in the system may be added to a cache 130*a* (e.g., a "resource" cache). One notable benefit of caching resources into the resource cache is that the cached resource may be reused without requiring additional costly messages between the requesting instance and the master instance. This provides significantly reduced costs to using the resource, since costly roundtrip network expenses can be avoided for the lock request messages across the network if the resource is cached.

One problem addressed by embodiments of the invention is that caching resources without regard to their usage patterns can cause a range of performance problems. This is because the system can end up with large caches of resources that are unlikely to be reused. In extreme cases, this situation can lead to severe storage pressure, leading ultimately to instance crashes. However, controlling the cache size through more aggressive cleanup (again, without regard to usage patterns) can lead to other performance problems as the rate of cache misses increases, with a corresponding increase in lock messaging activity (particularly for resources that are mastered remotely) and delays in accessing resources.

Sizing the cache is a balance between causing storage issues if the cache is sized too large, while possibly causing performance issues if sized too small. Conventional solutions to try and control cache sizes have primarily focused on replacement policies; that is, determining when to remove resources from the cache once they have been added (e,g, using a Least Recently Used (LRU) policy), rather than avoiding caching those resources in the first place. Where there have been attempts to avoid caching specific resources, resource types have been manually and statically selected to cache or not cache (e.g., choosing to avoid caching specific types such as LOB types). This approach can be helpful in the right circumstances, but unfortunately merely provides a static solution that cannot adjust or react to changing workloads or conditions.

The present embodiment of the invention provides a cache manager 128*a* that is able to dynamically determine the optimal cache size for a given system by using a set of resource type statistics 150. The resource type statistics 150 tracks resource usage on a resource type basis. In this way, the cache 130*a* can be managed depending on which resource types see either high or low rates of reuse, which can vary depending on the workload. The composition of the cache can thus be dynamically determined on a resource type basis to increase performance, either in terms of disabling caching for certain resource types or restarting/increasing caching for other resource types. This approach therefore provides the advantages of permitting a given system/workload to size the cache as small as possible without impacting performance with excessive cache misses.

Figure 2:
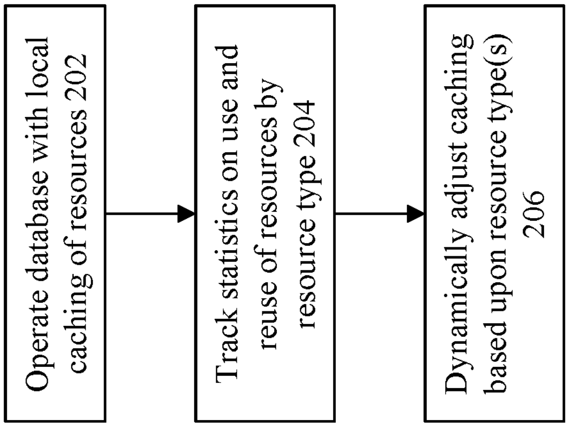
FIG. 2 shows a high-level flowchart of an approach to implement some embodiments of the invention.

FIG. 2 shows a high-level flowchart of an approach to implement some embodiments of the invention. At 202, a database system is operated with local caching of resources. For example, the database system may correspond to a clustered system having a shared database that allows a single database to be run across multiple instances/nodes. A DLM may exist in the system to control access to the resources in the system, where upon a "cache miss", a request may need to be sent to a master on a remote instance to obtain the appropriate lock permissions to access a given resource. However, a "cache hit" allows the instance to avoid sending this type of message to access the resource.

At 204, statistics are tracked for the use and reuse of resources in the system, where the statistics are maintained on a resource type basis. This approach avoids excessive costs that may need to be incurred if statistics are individually tracked for each and every distinct resource. Instead, by tracking at the granularity of the resource type (rather than individual resources themselves), this allows the system to still make appropriate dynamic decisions for the management of the cache while using less system expenses, since the lower amount of data for statistics at the resource type level means that comparatively less storage is needed to hold statistics on a resource type basis as compared to storing statistics for every resource. Furthermore, this approach requires less memory to be used when analyzing the statistics, and likewise improves the computational efficiency of a processor that is used to perform the analysis.

At 206, the statistics are analyzed to dynamically adjust caching in the system based upon the resource types. These actions may include the disabling of caching for certain resource types, the start or restart of caching for resource types, and/or the increase or decrease of caching for certain resource types.

Figure 3:
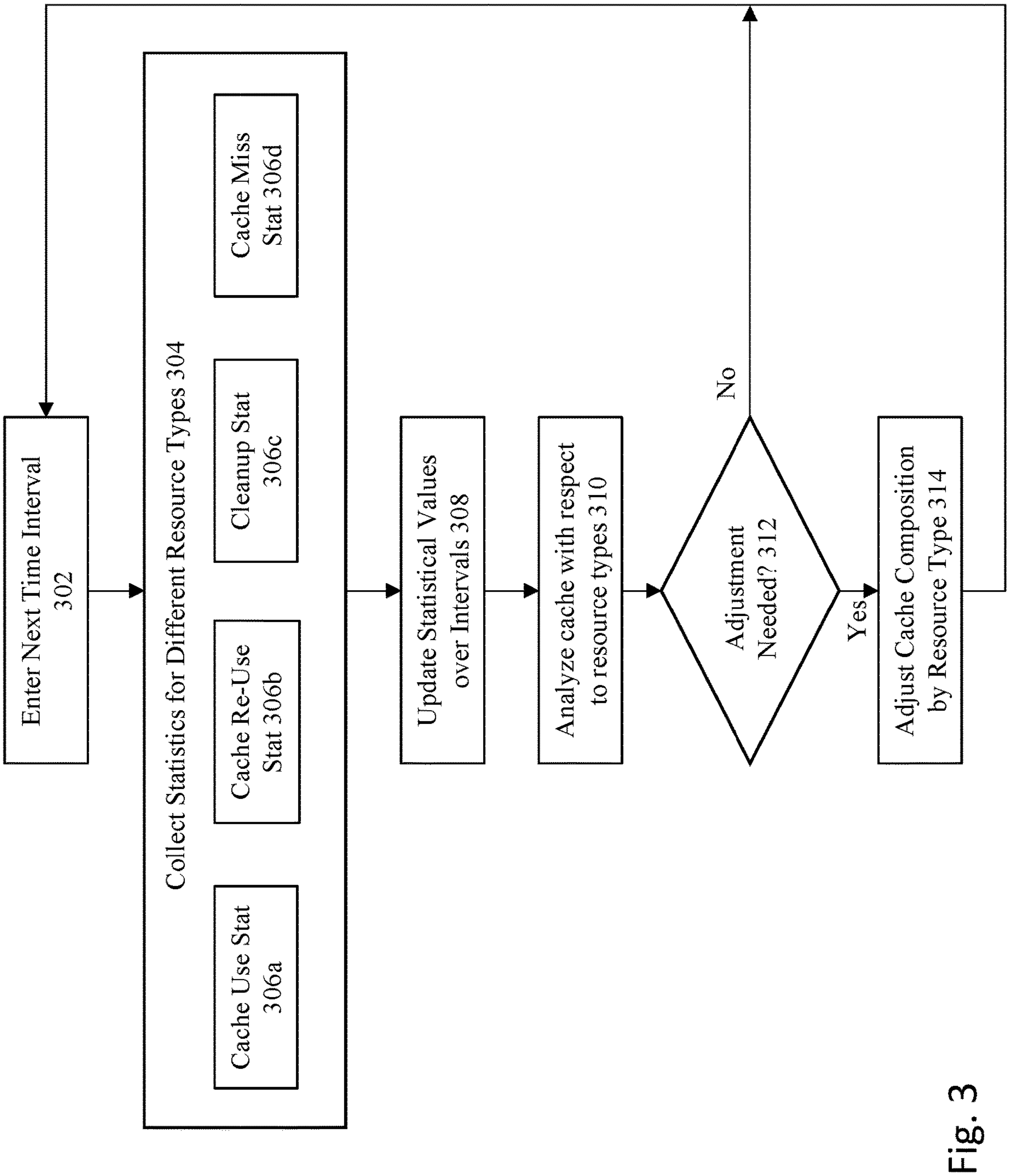
FIG. 3 shows a more-detailed flowchart to implement some embodiments of the invention.

FIG. 3 shows a more-detailed flowchart to implement some embodiments of the invention. At 302, the process enters a next time interval for the analysis and processing. In the current embodiment, the analysis is performed on a time interval basis, where statistics are collected for a current time interval, and an ongoing look is made at those statistics in the context of previous time intervals. It is noted that a series of multiple time intervals may be needed to reach and obtain a baseline of the activities in the system.

At 304, for the current time interval, a set of statistics is collected for the different resource types. Resources can be categorized into types according to their function. In some systems, the resource's type can be found as part of the name of the resource, possibly along with identifiers that together refer to the specific resource. In other systems, the resource metadata may be used to identify the type for a resource.

A resource type data structure can be implemented that includes one or more counters. These counters can be updated within the resource type structures, such that whenever a relevant operation is performed on a resource, the appropriate counter for that resource's type will be updated.

A number of different statistics can be collected that are tracked on a per-resource-type basis. At 306*a,* a first example statistic to track is the "cache use" statistic, which tracks the total number of resources of that type in the cache.

At 306*b,* a second example statistic to track is the "cache reuse" statistic. This tracks the number of times resources of that type that have been reused from the cache. In effect, this statistic tracks the cache hits for the given resource types.

At 306*c,* a third example statistic to track is the "cache cleanup" statistic. This tracks the number of resources of that type that have been cleaned up or freed from the cache.

At 306*d,* a fourth example statistic to track is the "cache miss" statistic. In some embodiments, this statistic is used to track only certain types of cache misses. For example, this statistic may be used to only track DLM lock request messages, and/or convert messages, e.g., where this statistic is be used to track the number of convert requests that have been sent for resources of this type, which refers to the number of times a requested resource of that type is not found in the local cache and has to be requested from a remote instance. The reason to specifically track the number of convert messages is because this corresponds to a proxy for a very expensive type of cache miss that would require a network-based DLM request and response—rather than other types of cache misses that does not require such additional expenses.

A list of the resource types is maintained. Each entry in the list contains information about the use and treatment of that type. This includes identifiers and associated wait events, in addition to information about the statistics described above. The entries may also a flag indicating whether resources of that type should be cached or freed immediately.

Various operations may occur that update the statistics. Examples of such operations include, for example: (a) a resource is added to the cache; (b) a resource is freed and/or cleaned from the cache; (c) a resource is reused from the cache; (d) a lock request (e.g., a convert message) is sent for a resource. The appropriate fields in the statistical information structure are updated as appropriate for each operation. For example, whenever a resource is moved to the cache, the system checks its resource type and increments its cache count. Whenever a resource is freed, then if it was cached, the system checks its resource type and decrements its cache count. Whenever a resource is removed from the cache via cleanup, the system checks its resource type and increments the cleanup count for the relevant cache level. Whenever a resource is referenced, if it was cached, then the system checks its resource type and increments the reuse count. Whenever a lock request (convert message) is sent for a resource, the system checks the resource type and increments the total number of convert messages.

The system provides a framework in some embodiments for periodically checking the series of metrics and, based on the results of those metrics, taking a series of actions. For example, a background process and/or various helper processes can be used to perform these checks.

At 308, various statistical values are updated or otherwise maintained over the multiple intervals. For example, the collected statistics for the current time interval are used to update a rolling average of the statistics over multiple time intervals. In addition, standard deviation values may be calculated for the statistics. An additional option may be implemented to check for the success or failure of a numerical metric on a statistical basis.

At 310, analysis is performed upon the cache with respect to the resource types. The rolling average and standard deviation values that were previously determined are used for detecting situations that may deserve dynamic changes to the cache. Fundamentally, the system operates by checking the counters at regular intervals and uses that analysis to determine which resource types will be cached. If the average reuse rate for a given resource type on that interval (obtained by dividing the difference in the reuse counter value from the start of the interval to the end of the interval by the number of cached resources) is below a certain threshold, that type of resource will stop caching. This should prevent situations where the cache fills with resources that will never be reused.

Anomalous values may be detected with respect to the cache management values (e.g., after a minimum number of observations to determine a baseline). A value is considered anomalous if it deviates from the average by more than a certain number of standard deviations (set as part of the metric definition). This allows the metrics to automatically adapt to a variety of setups without needing to change code or parameter values, while still detecting any significant changes. By maintaining the rolling averages, this allows the system to adjust and learn new "normal" conditions and to detect any anomalies that deviate from and should be addressed from the new normal conditions.

When performing the analysis, certain calculations may be performed to generate metrics that are used for the analysis. For example, the system may generate non-cached message rates to essentially identify a cache miss rate based upon convert messages. This can be calculated by, for each resource type, by determining the change in the number of convert messages sent for that type by subtracting the previously observed number of convert messages from the current number. The rate of convert messages is then determined by dividing that value by the amount of time since the last observation. This updates the previously observed value and the update time, and uses the existing statistical metric framework to determine whether the calculated rate is anomalously high. If it is, then in the appropriate data structure the system will mark the metric with the appropriate notation (e.g., mark as "failed" and store the resource type under this metric's list of messages).

Another calculation can be performed to determine cache efficiency. For each resource type, this calculation determines the change in the number of reuses from cache for resources of a given type by subtracting the previously observed number of reuses. The calculation divides this by the current number of cached resources of that type to get the rate of reuse. It is noted that this is ignored if there are no cached resources. The system updates the previously observed value and the update time, and uses the statistical framework to determine the current average reuse rate. If that rate is below a configurable threshold, then the system marks the metric as appropriate (e.g., mark as "failed" and stores the resource type under this metric's list of messages).

At 312, a determination will be made whether to adjust the system caching. For example, once enough data has been collected to establish a baseline, if the rate of convert messages for an uncached resource type increases too quickly, that type or resource will start caching. An overly quick increase is defined in some embodiments as three consecutive observations that differ from the rolling average by more than two standard deviations. This will allow non-cached resource types that are now being reused at a greater rate to be detected and cached. An increase in the number of requests indicates that requested resources of the given type are not being found in the cache; if the increase follows a decision to stop caching that resource type, this indicates that not caching that resource type is having a negative impact on performance. If most resources of a given type are not reused, there should not be a significant difference in the number of requests sent when those resources are not cached compared to when they are. The reason to make adjustment decisions using standard deviations is to require sustained changes in order to trigger caching changes. This will reduce the likelihood of temporary spikes in conditions that affect the system caching.

At 314, the cache composition will then be adjusted on a resource type basis. Certain operations may occur in this step. For example, the system may start caching a specific resource type. This may occur, for example, if the non-cached message rate is marked as a "metric fail" for the resource type, which can be identified by checking a list of messages for that metric to determine which resource types failed the metric. For each message, check if the resource type is currently cached. If it is not, unset the flag in the type data structure that indicates that it should be freed immediately. This will allow resources of that type to be cached. If the resource type is currently cached, then do nothing at this point.

Another possible operation is to stop caching a given resource type. If the cache efficiency metric fails to meet a threshold, then the system checks the list of messages for that metric to determine which resource types failed the metric. For each message, check if the resource type is currently cached. If it is, then set the flag indicating that it should be freed immediately. This will prevent resources of that type from being added to the cache. If the resource type is not currently cached, then do nothing at this point.

Figure 4A:
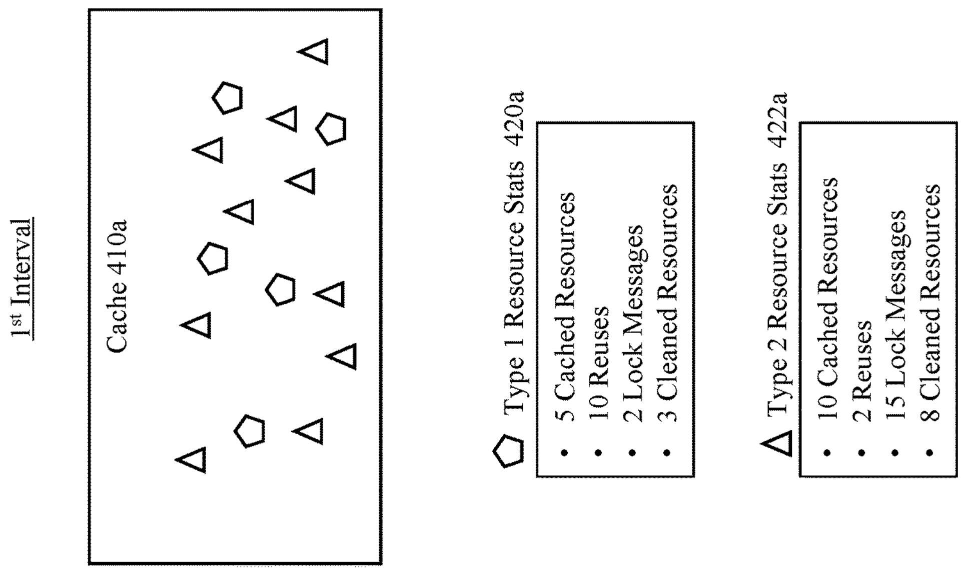
FIGS. 4A-D provide an illustrative example of an embodiment of the invention.

FIGS. 4A-D provide an illustrative example of an embodiment of the invention. FIG. 4A shows the statistics gathered for a 1st time interval for two different resource types in the system that are cached in cache 410*a*. The statistics 420*a* for resource type 1 indicate that for the $1^{st}$ time interval, there are 5 cached resources of this resource type. In this time interval, there were 10 reuses, 2 convert messages, and 3 cleaned resources for this resource type. The statistics 422*a* for resource type 2 indicate that for the $1^{st}$ time interval, there are 10 cached resources of this resource type. In this time interval, there were 2 reuses, 15 convert messages, and 4 cleaned resources for this resource type.

Figure 4B:
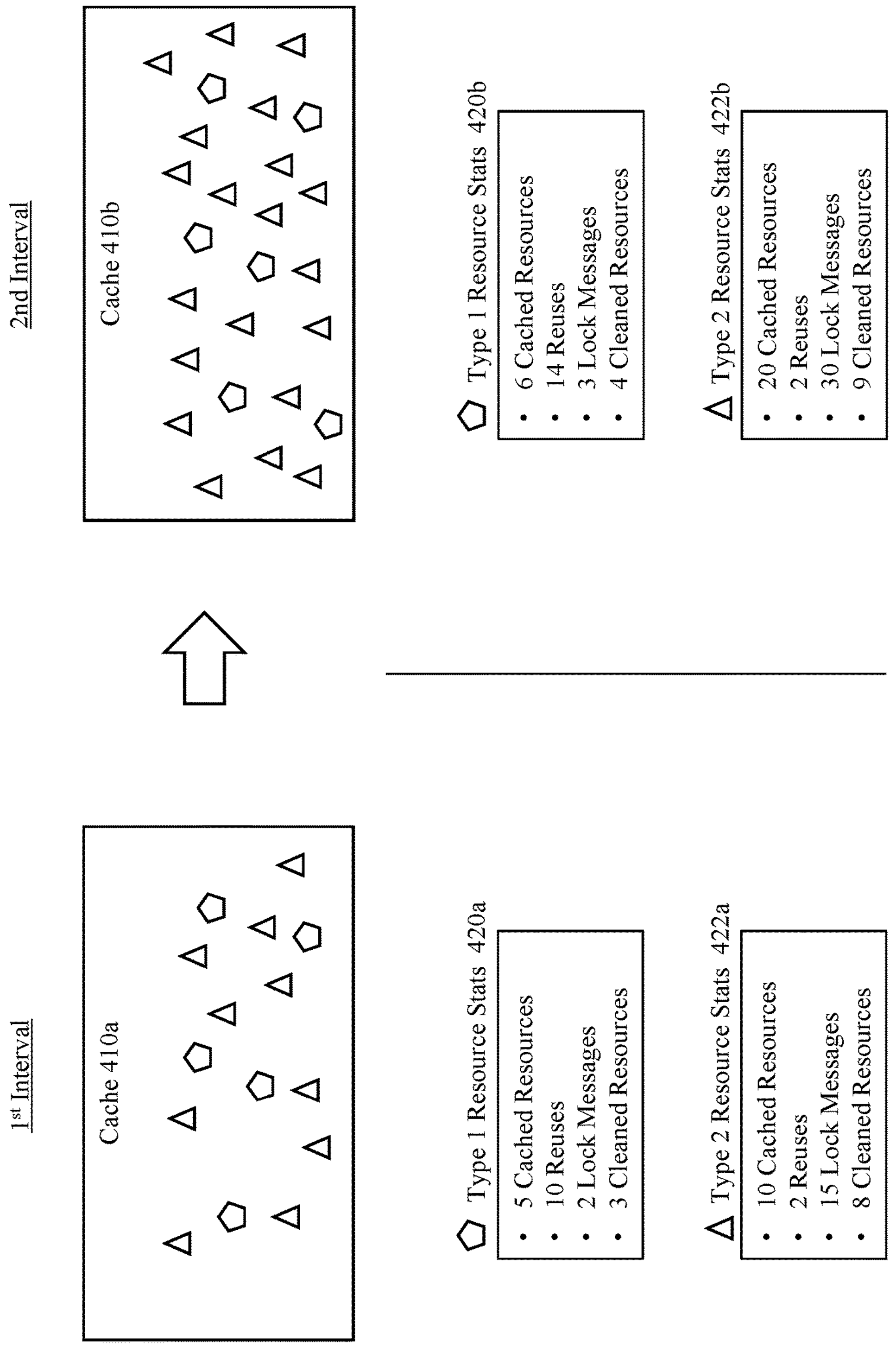

FIG. 4B shows the statistics gathered for a $2^{nd}$ time interval for the two different resource types in the system that are cached in cache 410*a*. The statistics 420*b* for resource type 1 indicate that for the $2^{nd}$ time interval, there are 6 cached resources of this resource type. In this time interval, there were 20 reuses, 6 convert messages, and 5 cleaned resources for this resource type. The statistics 422*b* for resource type 2 indicate that for the $2^{nd}$ time interval, there are 15 cached resources of this resource type. In this time interval, there were 4 reuses, 35 convert messages, and 6 cleaned resources for this resource type.

Figure 4C:
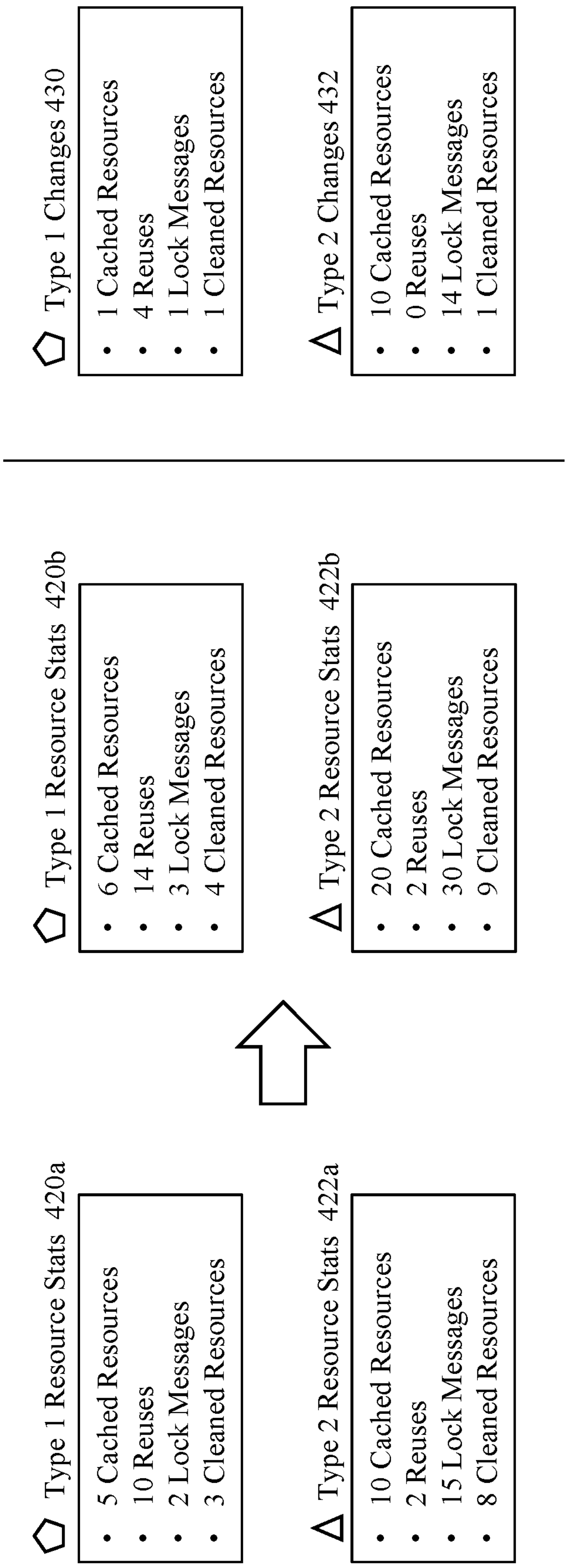

FIG. 4C shows some changes that occur in the statistics for the transition from the $1^{st}$ time interval to the $2^{nd}$ time interval for each of these resource types. For resource type 1, there was a plus 1 increase in cached resources, a plus 10 increase in reuses, a plus 4 increase in convert messages, and a plus 2 increase in cleaned resources. For resource type 2, there was a plus 5 increase in cached resources, plus 2 increase in reuses, a plus 20 increase in convert messages, and a plus 2 increase in cleaned resources.

Figure 4D:
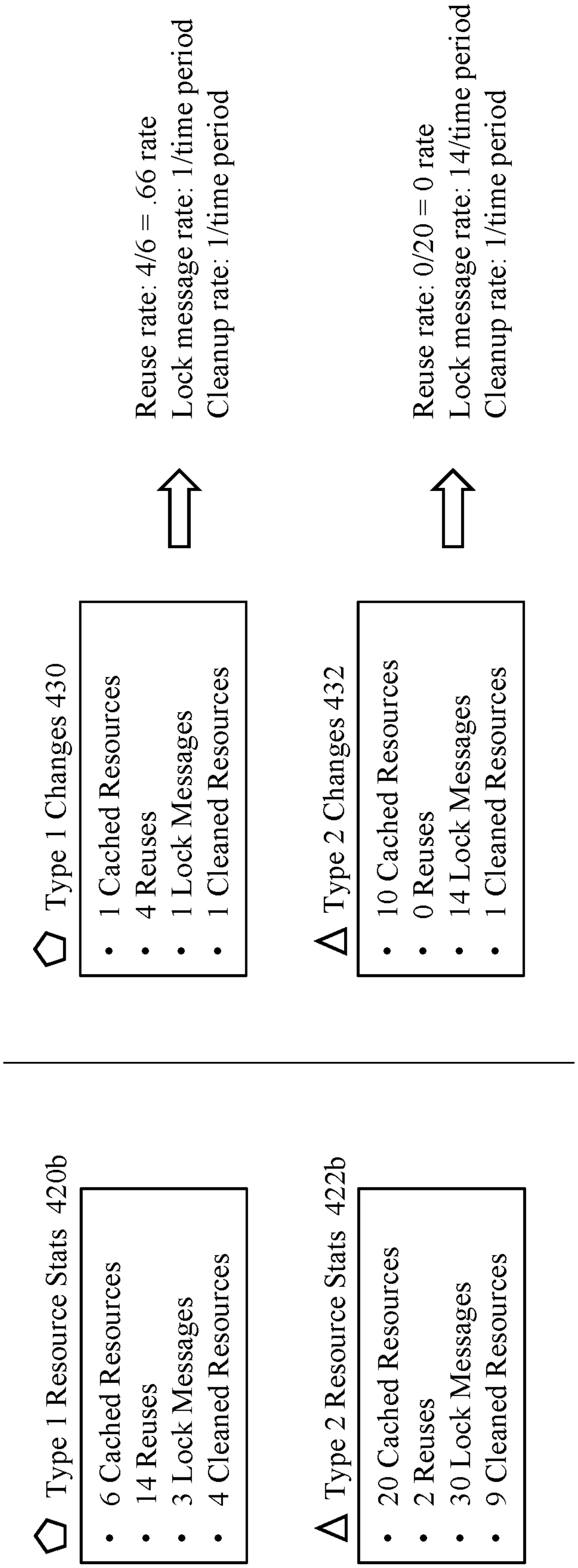

FIG. 4D shows some additional statistical and/or rate values that can be derived from the changes that occur in the statistics for the transition from the $1^{st}$ time interval to the $2^{nd}$ time interval for each of the resource types.

For resource type 1, the reuse rate corresponds to (10/6) or 1.7 reuse rate, which is calculated by taking the number of reuses (10) divided by the number of cached resources (6), further divided by the time interval. The lock/convert message rate corresponds to (4/interval), which corresponds to the delta number of convert messages (1) divided by the time interval. The cleanup rate corresponds to (2/6) for the interval, which is the change in number of convert messages (1) over the time interval.

For resource type 2, the reuse rate corresponds to (2/15) or 0.13 reuse rate, which is calculated by taking the delta number of reuses (2) divided by the number of cached resources (15), further divided by the time interval. The lock/convert message rate corresponds to (20/interval), which corresponds to the delta number of convert messages (20) divided by the time interval. The cleanup rate corresponds to (2/15) for the interval, which is the change in number of convert messages (2) over the time interval.

Assuming the rolling averages and standard deviations generally correlate to these values, then certain conclusions can be drawn for these examples. For the type 2 resource type, it does not appear that system caching for this resource type is helping to improve system performance. What this means is that even though there is a relatively high level of caching for resources of this type, the reuse rate is very low. In addition, the lock/convert message rate is very high for this resource type despite the relatively high caching level. This indicates that the system cache size can likely be adjusted to decrease and/or stop caching of this resource type, while not significantly negatively affecting system performance.

On the other hand, for the type 1 resource type, it does appear that system caching for this resource type does help system performance. Even though there is a relatively low level of caching for resources of this type, the reuse rate is relatively high. In addition, the lock/convert message rate is very low for this resource type despite the relatively low caching level. This indicates that the system cache size likely should be maintained or even increased for caching of this resource type. In addition, this indicates that caching should not be turned off for this resource type, since this would negatively affect system performance and likely increase convert message requests.

While the cleanup rates were relatively neutral in this example, it is noted that the cleanup rate may also be used in some embodiments to adjust the caching for resource types. For example, since the cleanup rate can generally be seen as the opposite of the reuse rate, if a high cleanup rate is observed, then the system may use this information to decide to stop or decrease caching for that resource type. On the other hand, if a low cleanup rate is observed, then the system may use this information to decide to start or increase caching for that resource type.

Therefore, what has been described is an improved approach to implement dynamic adjustment of caching for a computing system based upon resource type. The system can dynamically change which resource types are cached or not cached based on current usage patterns. These changes happen automatically without outside input and allow the system to stop caching resource types that are not being reused and start caching resource types that are generating additional messaging activity due to cache misses. This allows the same amount of cache space to be used more effectively in a way that is responsive to changes in workload. By not caching resource types that are not being reused, this increases the efficiency of the cache. Caching resource types with increased messaging activity prevents the increased efficiency from coming at the expense of performance with regard to cache misses.

Changing which resource types are cached dynamically based on actual resource use behavior patterns allows the system to better respond to a range of conditions and make more effective use of cache space.

System Architecture Overview

Figure 5:
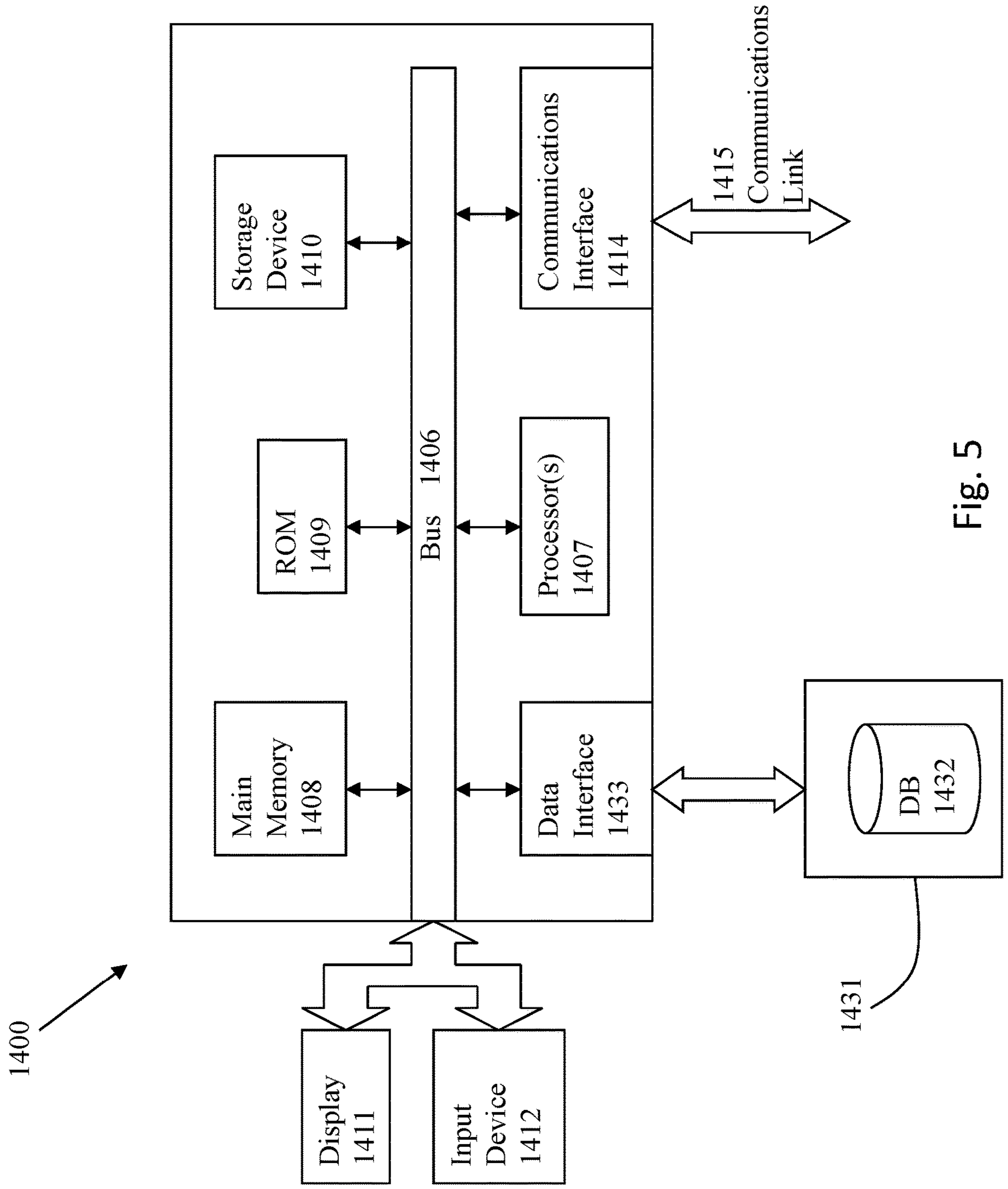
FIG. 5 illustrates a block diagram of an illustrative computing system suitable for implementing an embodiment of the present disclosure.

FIG. 5 is a block diagram of an illustrative computing system 1400 suitable for implementing an embodiment of the present disclosure. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, and cursor control.

According to some embodiments of the disclosure, computer system 1400 performs specific operations by processor 1407 executing one or more sequences of one or more instructions contained in system memory 1408. Such instructions may be read into system memory 1408 from another non-transitory computer readable/usable medium, such as static storage device 1409 or disk drive 1410. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term non-transitory "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1400. According to other embodiments of the disclosure, two or more computer systems 1400 coupled by communication link 1410 (e.g., LAN, PTSN, or wireless network) may perform the sequence of instructions required to practice the disclosure in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400 via data interface 1433.

Figure 6:
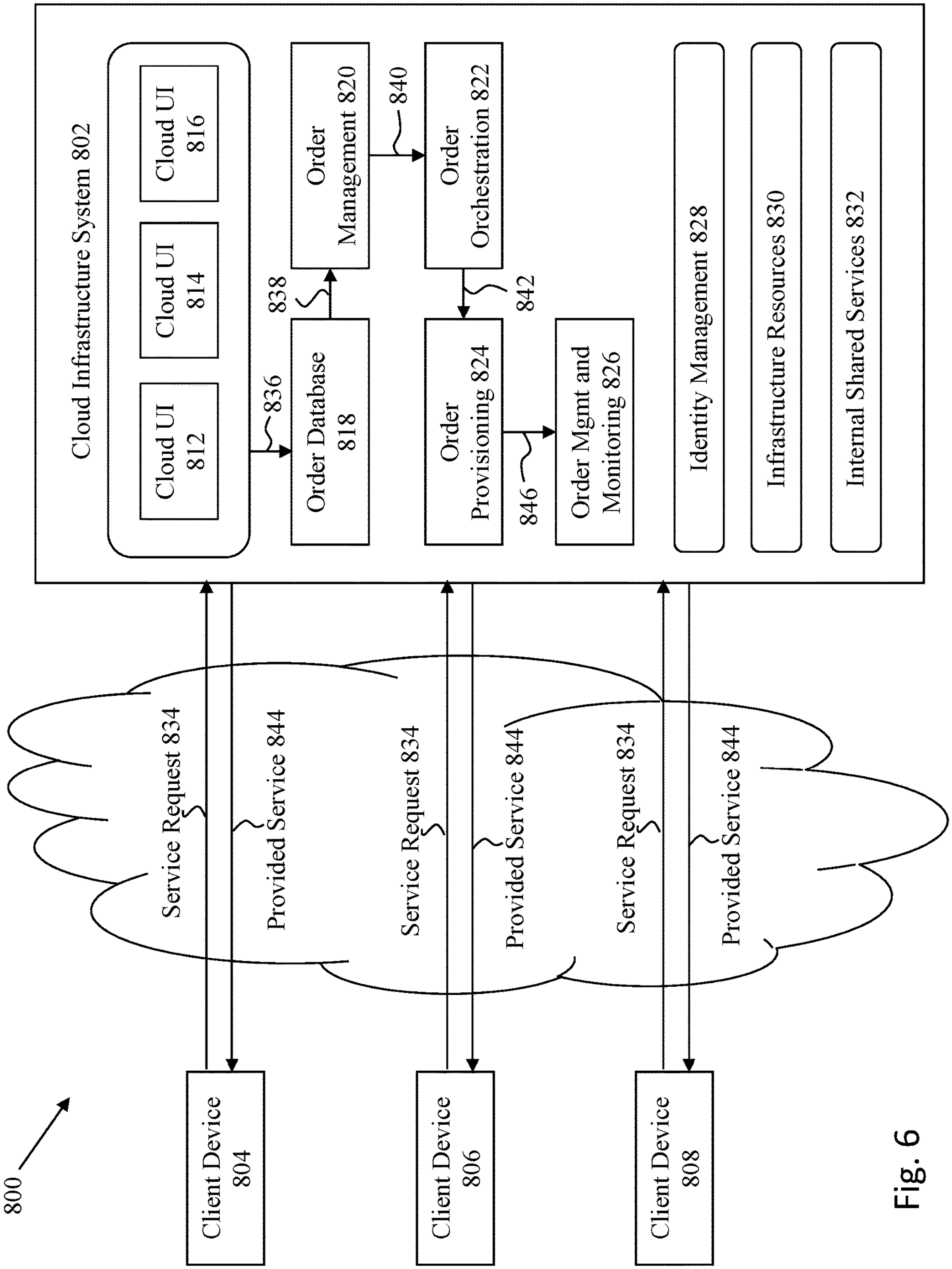
FIG. 6 illustrates a block diagram of one or more components of a system environment by which more efficient access to ordered sequences in a database environment is provided, in accordance with an embodiment of the present disclosure.

FIG. 6 is a simplified block diagram of one or more components of a system environment 1500 by which more efficient access to ordered sequences in a clustered database environment is provided, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the disclosure. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between client computing devices 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client computing devices 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1502 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 allows the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 allows the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client computing devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:

operating a database system with caching of resources;

tracking statistics for use or reuse of the resources on a resource type basis, wherein a resource type for a corresponding resource is specified in a name or metadata of the corresponding resource and individual ones of the statistics represent use or reuse of multiple resources of a respective single resource type; and using the statistics that were tracked for use or reuse of the resources on the resource type basis to adjust the caching of one or more resource types in the database system, wherein at least one statistic of the statistics tracks a number of requests to obtain locks on one or more resources of a particular resource type during a first time period in which resources of the particular resource type are not cached, and wherein the caching of the particular resource type is started in a second time period, subsequent to the first time period, based at least in part on the at least one statistic that tracks the number of requests to obtain locks.

2. The method of claim 1, wherein the statistics for use or reuse of the resources on the resource type basis comprise at least one of a cache use statistic, a cache reuse statistic, a cleanup statistic, or a cache miss statistic.

3. The method of claim 1, wherein the requests to obtain locks on one or more of the resources comprise convert messages.

4. The method of claim 1, wherein at least one of the requests to obtain locks on the one or more resources of the particular resource type is sent from a first database instance to a second database instance over a network.

5. The method of claim 1, wherein a reuse rate is calculated for a given resource type over a time interval, and the reuse rate is analyzed to determine whether to adjust the caching for the given resource type.

6. The method of claim 5, wherein the reuse rate is determined by dividing a difference in a reuse counter value from a start of a time interval to an end of the time interval by a number of cached resources for the given resource type.

7. The method of claim 1, wherein rolling average and standard deviation values for the statistics are used to determine whether to adjust the caching of the resource types in the database system.

8. A system comprising:

a processor; and a memory to hold a set of program code instructions, in which the set of instructions comprises program code to perform operating a database system with caching of resources; tracking statistics for use or reuse of the resources on a resource type basis, wherein a resource type for a corresponding resource is specified in a name or metadata of the corresponding resource and individual ones of the statistics represent use or reuse of multiple resources of a respective single resource type; and using the statistics that were tracked for use or reuse of the resources on the resource type basis to adjust the caching of one or more resource types in the database system, wherein at least one statistic of the statistics tracks a number of requests to obtain locks on one or more resources of a particular resource type during a first time period in which resources of the particular resource type are not cached, and wherein the caching of the particular resource type is started in a second time period, subsequent to the first time period, based at least in part on the at least one statistic that tracks the number of requests to obtain locks.

9. The system of claim 8, wherein the statistics for use or reuse of the resources on the resource type basis comprise at least one of a cache use statistic, a cache reuse statistic, a cleanup statistic, or a cache miss statistic.

10. The system of claim 8, wherein the requests to obtain locks on one or more of the resources comprise convert messages.

11. The system of claim 8, wherein at least one of the requests to obtain locks on the one or more resources of the particular resource type is sent from a first database instance to a second database instance over a network.

12. The system of claim 8, wherein a reuse rate is calculated for a given resource type over a time interval, and the reuse rate is analyzed to determine whether to adjust the caching for the given resource type.

13. The system of claim 12, wherein the reuse rate is determined by dividing a difference in a reuse counter value from a start of a time interval to an end of the time interval by a number of cached resources for the given resource type.

14. The system of claim 8, wherein rolling average and standard deviation values for the statistics are used to determine whether to adjust the caching of the resource types in the database system.

15. A computer program product embodied on a non-transitory computer readable medium having stored thereupon instructions which, when executed by a processor, cause the processor to perform a set of acts, the set of acts comprising:

operating a database system with caching of resources;

tracking statistics for use or reuse of the resources on a resource type basis, wherein a resource type for a corresponding resource is specified in a name or metadata of the corresponding resource and individual ones of the statistics represent use or reuse of multiple resources of a respective single resource type; and using the statistics that were tracked for use or reuse of the resources on the resource type basis to adjust the caching of one or more resource types in the database system, wherein at least one statistic of the statistics tracks a number of requests to obtain locks on one or more resources of a particular resource type during a first time period in which resources of the particular resource type are not cached, and wherein the caching of the particular resource type is started in a second time period, subsequent to the first time period, based at least in part on the at least one statistic that tracks the number of requests to obtain locks.

16. The computer program product of claim 15, wherein the statistics for use or reuse of the resources on the resource type basis comprise at least one of a cache use statistic, a cache reuse statistic, a cleanup statistic, or a cache miss statistic.

17. The computer program product of claim 15, wherein the requests to obtain locks on one or more of the resources comprise convert messages.

18. The computer program product of claim 15, wherein at least one of the requests to obtain locks on the one or more resources of the particular resource type is sent from a first database instance to a second database instance over a network.

19. The computer program product of claim 15, wherein a reuse rate is calculated for a given resource type over a time interval, and the reuse rate is analyzed to determine whether to adjust the caching for the given resource type.

20. The computer program product of claim 19, wherein the reuse rate is determined by dividing a difference in a reuse counter value from a start of a time interval to an end of the time interval by a number of cached resources for the given resource type.

21. The computer program product of claim 15, wherein rolling average and standard deviation values for the statistics are used to determine whether to adjust the caching of the resource types in the database system.

* * * * *